(12) United States Patent
Liao et al.

(10) Patent No.: US 11,262,494 B2
(45) Date of Patent: Mar. 1, 2022

(54) LIGHT GUIDE PLATES WITH LIQUID CRYSTAL MOLECULES

(71) Applicant: Hewlett-Packard Development Company, L.P., Spring, TX (US)

(72) Inventors: Super Liao, Taipei (TW); Hsing-Hung Hsieh, Taipei (TW); Kuan-Ting Wu, Taipei (TW)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/048,626

(22) PCT Filed: Nov. 2, 2018

(86) PCT No.: PCT/US2018/058994
§ 371 (c)(1),
(2) Date: Oct. 19, 2020

(87) PCT Pub. No.: WO2020/091812
PCT Pub. Date: May 7, 2020

(65) Prior Publication Data
US 2021/0247559 A1     Aug. 12, 2021

(51) Int. Cl.
*G02B 6/00*     (2006.01)
*F21V 8/00*     (2006.01)
(Continued)

(52) U.S. Cl.
CPC ......... *G02B 6/005* (2013.01); *G02F 1/13306* (2013.01); *G02F 1/13439* (2013.01)

(58) Field of Classification Search
CPC .. G02B 6/005; G02F 1/13306; G02F 1/13439
See application file for complete search history.

(56) References Cited

U.S. PATENT DOCUMENTS 7,001,035 B2   2/2006  Kawakami
7,551,243 B2   6/2009  Cernasov
(Continued)

FOREIGN PATENT DOCUMENTS

JP   2008089728 A   4/2008
JP   2010181581 A   8/2010

OTHER PUBLICATIONS

Ailton De Souza Gomes. New Polymers Networks for PDLC Films Application. New Polymers fir Special Applications. 2012, p. 139.

*Primary Examiner* — Anne M Hines
(74) *Attorney, Agent, or Firm* — HP Inc. Patent Department

(57) ABSTRACT

An example display device includes a display panel to display an image; a backlight unit to provide light to the display panel, the backlight unit including a light emitting unit to emit the light; a light guide plate to transmit the light emitted from the light emitting unit; a pair of electrodes adjacent to the light guide plate; and a polymer layer including liquid crystal molecules within the light guide plate. The liquid crystal molecules are to change orientation upon being introduced to an electric field created by the pair of electrodes to change an opacity of the light guide plate. The display device includes at least one film to collimate and direct light from the backlight unit to the display panel; and a processor to switch voltage being applied on/off to the pair of electrodes.

15 Claims, 11 Drawing Sheets

(51) Int. Cl.
  *G02F 1/133*    (2006.01)
  *G02F 1/1343*   (2006.01)

(56)            References Cited

U.S. PATENT DOCUMENTS

| | | | |
|---|---|---|---|
| 7,746,424 | B2 | 6/2010 | Kameyama et al. |
| 8,031,292 | B2 | 10/2011 | Chun et al. |
| 8,203,672 | B2 | 6/2012 | Hwang |
| 8,525,950 | B2 | 9/2013 | Jung |
| 8,643,804 | B2 | 2/2014 | Shin et al. |
| 2006/0181662 | A1* | 8/2006 | Kameyama ....... G02F 1/133528 349/117 |
| 2007/0091642 | A1 | 4/2007 | Lee et al. |
| 2010/0110727 | A1 | 5/2010 | Iwasaki |
| 2010/0246015 | A1 | 9/2010 | Iwasaki |
| 2011/0261303 | A1* | 10/2011 | Jang ................. G02F 1/1334 349/108 |

\* cited by examiner

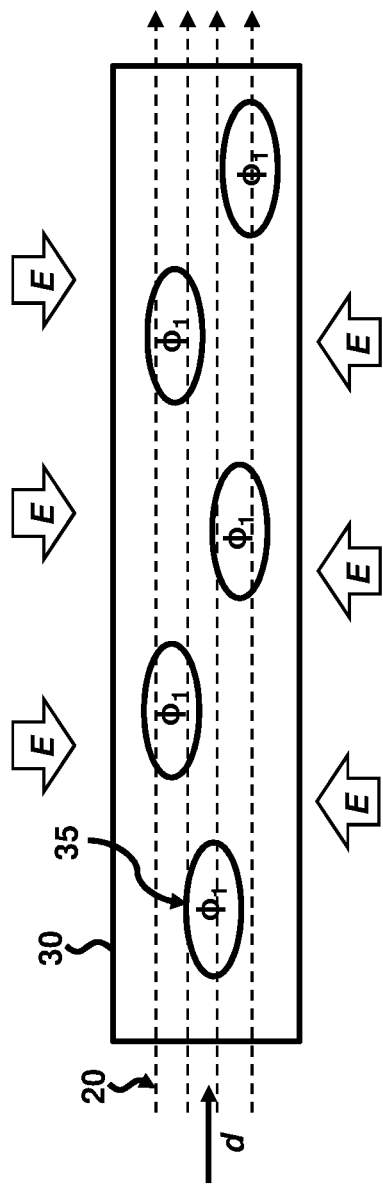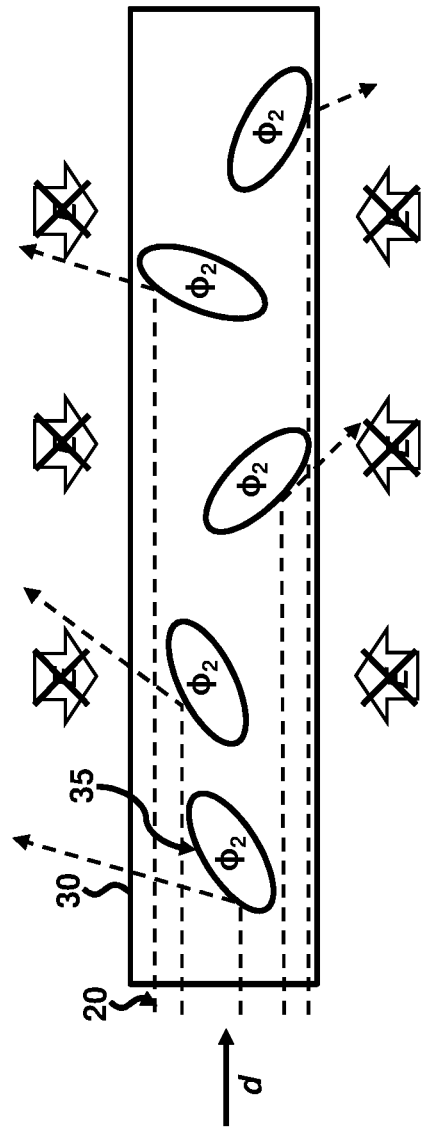

LIGHT GUIDE PLATES WITH LIQUID CRYSTAL MOLECULES

BACKGROUND

Liquid crystal display (LCD) devices utilize light to display images. Light may be projected at different angles into the LCD panel. The uniformity of the images may be affected by the light.

BRIEF DESCRIPTION OF THE DRAWINGS

The following detailed description references the drawings, in which:

FIG. 11 is a cross-sectional diagram illustrating a uniform orientation of the liquid crystal molecules of the polymer layer in the light guide plate of FIG. 10, according to an example.

FIG. 12 is a cross-sectional diagram illustrating a random orientation of the liquid crystal molecules of the polymer layer in the light guide plate of FIG. 10, according to an example.

Figure 1:
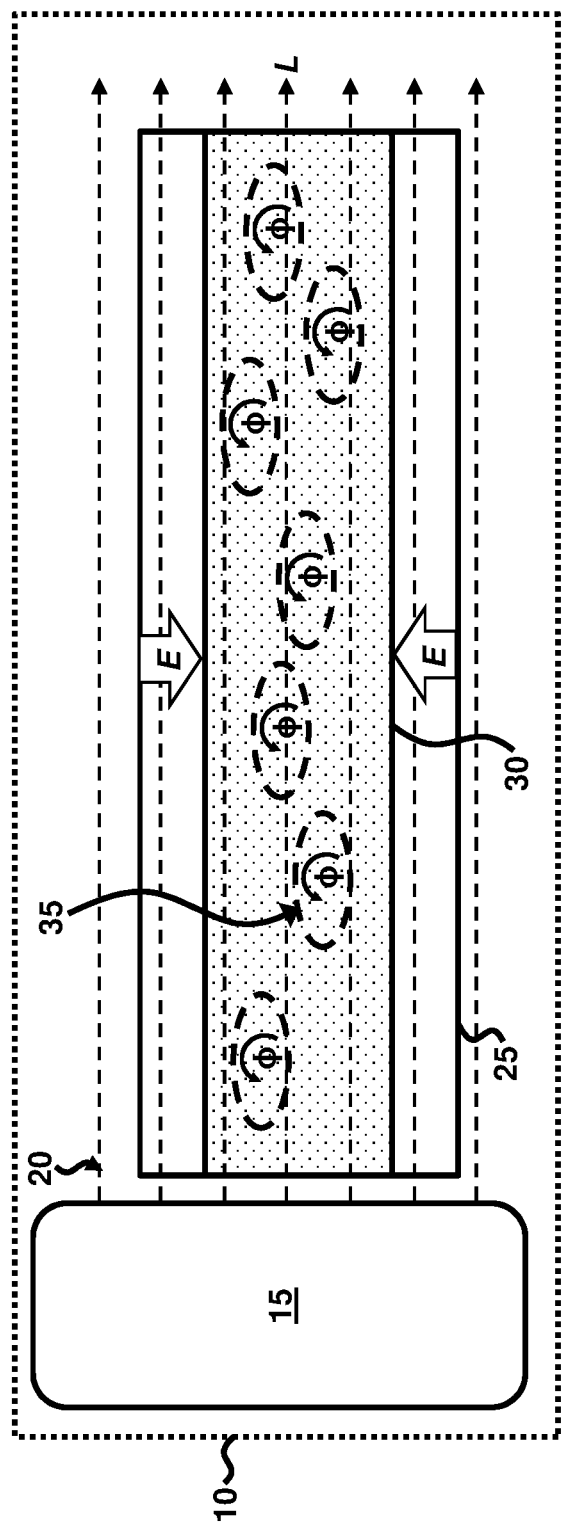
FIG. 1 is a cross-sectional diagram illustrating a backlight unit including a light guide plate with liquid crystal molecules, according to an example.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

Light guide plates are part of LCD display devices and are used to assist in directing light towards the LCD panel. The light may be generated by a light emitting diode (LED) or other similar device, and micro-structure patterning in the light guide plate or on the surfaces thereon help direct the light towards the LCD panel. Due to the micro-structure patterning, the uniformity of the projected light may be uneven causing issues of light leakage when using the local dimming function in the LCD panel. Moreover, the micro-structure patterning typically requires significant manufacturing resources resulting in increased manufacturing time and costs. However, due to the positioning of the LED with respect to the LCD panel, the light guide plate should use a technique that redirects the light.

An example system includes a light guide plate with liquid crystal molecules to allow a backlight unit to achieve better optical uniformity of the projected light. The light guide plate may be dependent on a different backlight size to generate a different pattern to have better backlight uniformity, which enhances the local dimming performance. The light guide plate contains multiple zones and each zone may be controlled to turn on/off by selectively applying a voltage. When the voltage is turned off in some of the light guide plate zones, light scatters by hitting irregularly oriented liquid crystal molecules. When the voltage is turned on in the light guide plate, light passes through the light guide plate directly hitting regularly oriented liquid crystal molecules. When light from the LED enters the light guide plate, the light is transmitted by total reflection until the voltage is turned off in a few light guide plate zones to change the light path to break the total reflection. When irregularly oriented liquid crystal molecules change the light path, then the light separates in two directions, one is out of the light guide plate that is then reflected by a reflector sheet providing light on the LCD panel, and the other is out of the top surface of the light guide plate providing light on the LCD panel. Because the brightness of the LCD display is to be uniform, the voltage off zone size will become larger moving away from the LED side of the light guide plate.

An example backlight unit comprises a light emitting unit to emit light; a light guide plate to transmit the light emitted from the light emitting unit; and a polymer layer comprising liquid crystal molecules within the light guide plate. The liquid crystal molecules are to change orientation upon being electrically actuated to change a luminance of the transmitted light. The polymer layer may comprise a first polyester film; a first transparent conductive film adjacent to the first polyester film; and a polymer material containing the liquid crystal molecules adjacent to the first transparent conductive film. The polymer layer may comprise a second polyester film; and a second transparent conductive film adjacent to the second polyester film. The polymer material is adjacent to the second transparent conductive film. The first transparent conductive film and the second transparent conductive film may sandwich the polymer material to create an electric field in the polymer material upon receiving a voltage. The polymer material may become opaque when the voltage is turned off.

Another example provides a display device comprising a display panel to display an image; a backlight unit to provide light to the display panel. The backlight unit comprises a light emitting unit to emit the light. The display device also includes a light guide plate to transmit the light emitted from the light emitting unit; a pair of electrodes adjacent to the light guide plate; and a polymer layer comprising liquid crystal molecules within the light guide plate. The liquid crystal molecules are to change orientation upon being introduced to an electric field created by the pair of electrodes to change an opacity of the light guide plate. The display device further comprises at least one film to collimate and direct light from the backlight unit to the display panel; and a processor to switch voltage being applied on/off to the pair of electrodes.

The polymer layer may comprise a plurality of zones containing the liquid crystal molecules, and the pair of electrodes are to selectively create the electric field to selective zones based on instructions received from the processor. The plurality of zones may become progressively larger in size in the polymer layer in a direction moving away from the light emitting unit. A light path of the light may be changed based on the change in orientation of the liquid crystal molecules. The display device may comprise a reflector adjacent to the light guide plate to reflect light through the light guide plate; and a diffusion layer between the light guide plate and the display panel to filter the transmitted light. The light guide plate may be devoid of patterned structures to transmit the light.

Another example provides a light guide plate comprising a first substrate; a first electrode adjacent to the first substrate; a second substrate; a second electrode adjacent to the second substrate; and a polymer layer of liquid crystal molecules arranged in zones in between the first electrode and the second electrode. The liquid crystal molecules are to change orientation upon the first electrode and the second electrode providing an electric field to selective zones. The zones may comprise different sizes. The liquid crystal molecules may comprise a uniform orientation to a direction of light transmitted through the polymer layer to permit a total reflection of the light through the polymer layer, and the uniform orientation may occur in the presence of the electric field. The liquid crystal molecules may comprise a random orientation to a direction of light transmitted through the polymer layer to prevent a total reflection of the light through the polymer layer, and the random orientation may occur in the absence of the electric field.

FIG. 1 illustrates an example backlight unit 10 comprising a light emitting unit 15 to emit light 20. The light emitting unit 15 may comprise a LED, a fluorescent lamp, or other type of component capable of emitting light 20. The light 20 may be emitted in a substantially uniform manner or may be directed non-uniformly according to various examples. Moreover, according to an example, the light emitting unit 15 may selectively emit the light 20 such that only portions of the light emitting unit 15 emit light 20, or the light 20 may be emitted in phases and intensities from the light emitting unit 15 including in a strobe-like effect. The light 20 may be directed linearly away from the light emitting unit 15 and angularly, according to some examples. Furthermore, the intensity of the light 20 may be based on the power of the light emitting unit 15. A light guide plate 25 is positioned adjacent to the light emitting unit 15. The light guide plate 25 may contact the light emitting unit 15 or may be slightly spaced apart from the light emitting unit 15. The light guide plate 25 may comprise translucent material to permit light 20 to enter and exit therethrough. In an example, the light guide plate 25 may transmit the light 20 emitted from the light emitting unit 15. Accordingly, the light guide plate 25 may transmit the light 20 through any of the top, bottom, and sides of the light guide plate 25.

The backlight unit 10 also includes a polymer layer 30 comprising liquid crystal molecules 35 within the light guide plate 25. The polymer layer 30 may also comprise translucent material, and is positioned to receive the light 20 and redirect the light 20 in various directions. The liquid crystal molecules 35 may be dissolved or dispersed into a liquid polymer followed by a solidification or curing to create the polymer layer 30. During the change of the polymer from a liquid to a solid polymer layer 30, the liquid crystal molecules 35 become materially incompatible with the solid polymer layer 30 and form droplets throughout the polymer layer 30. These droplets are referred to as the liquid crystal molecules 35 as shown in FIGS. 1 through 4 and described herein. The liquid crystal molecules 35 are provided to change orientation ϕ upon being electrically actuated (e.g., by applying an electric field ϕ to change a luminance L of the transmitted light 20. The orientation ϕ of the liquid crystal molecules 35 may be changed from a uniform orientation to a random orientation based on being electrically actuated or not being electrically actuated, respectively. The light scattering ability and/or power of the polymer layer 30 is adjustable through the application of the electric field E, for example. When the power is off; i.e., the polymer layer 30 is not electrically actuated, the visible light 20 scatters through the polymer layer 30 and the polymer layer 30 becomes opaque, according to an example. When the power is on; i.e., the polymer layer 30 is electrically actuated, the visible light 20 transmits through the polymer layer 30 and the polymer layer 30 becomes clear, according to an example.

Furthermore, the intensity of the electric field E may be attenuated so that the electric field E is not completely off, but rather is below a threshold required to cause the orientation ϕ of the liquid crystal molecules 35 to be changed from a uniform orientation to a random orientation.

Figure 2:
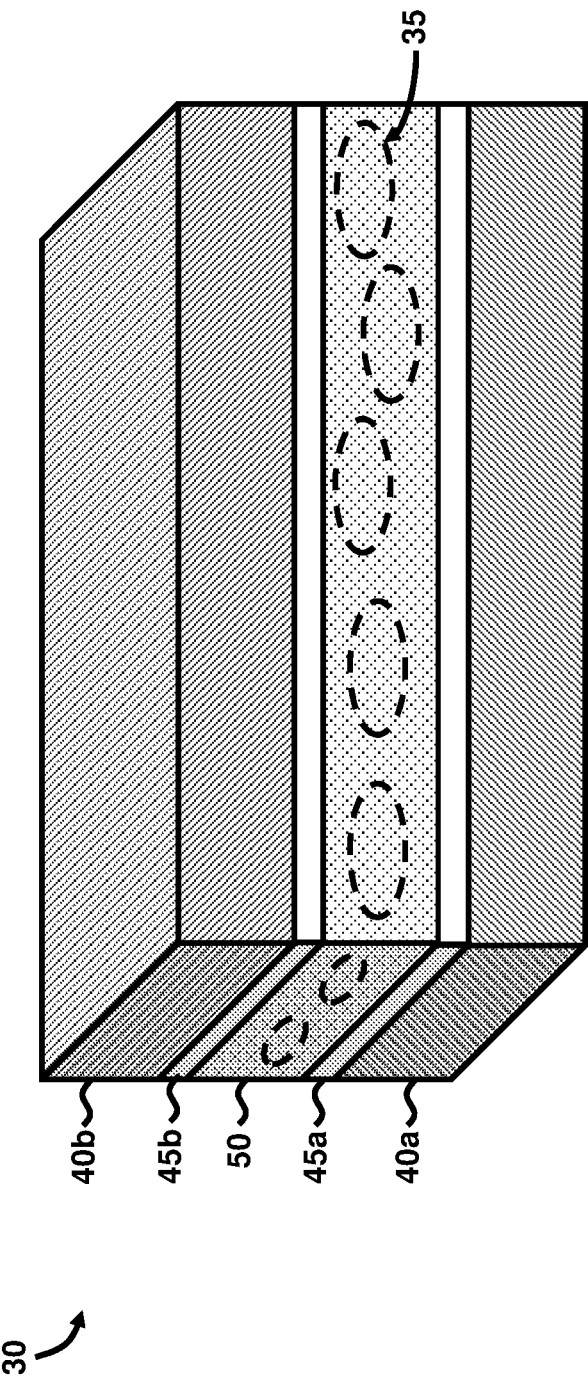
FIG. 2 is a perspective sectional diagram illustrating the polymer layer in the light guide plate of the backlight unit of FIG. 1, according to an example.

As shown in FIG. 2, with reference to FIG. 1, the polymer layer 30 may comprise a first polyester film 40a. In an example, the first polyester film 40a may comprise polyethylene terephthalate film. A first transparent conductive film 45a is adjacent to the first polyester film 40a. In an example, the first transparent conductive film 45a may comprise indium tin oxide (ITO). In another example, the first transparent conductive film 45a may comprise silver nanowire films (AgNWs). The polymer layer 30 further comprises a polymer material 50 containing the liquid crystal molecules 35 adjacent to the first transparent conductive film 45a. The polymer material 50, which comprises a translucent material, contains the liquid crystal molecules 35. Moreover, the polymer layer 30 may comprise a second polyester film 40b. In an example, the second polyester film 40b may comprise polyethylene terephthalate film. A second transparent conductive film 45b is adjacent to the second polyester film 40b. In an example, the second transparent conductive film 45b may comprise ITO. In another example, the second transparent conductive film 45b may comprise AgNWs. Furthermore, the polymer material 50 is adjacent to the second transparent conductive film 45b. Accordingly, the first transparent conductive film 45a and the second transparent conductive film 45b are positioned on opposite sides of the polymer material 50. Moreover, the first transparent conductive film 45a and the second transparent conductive film 45b may function as electrodes in the polymer layer 30.

Figure 3:
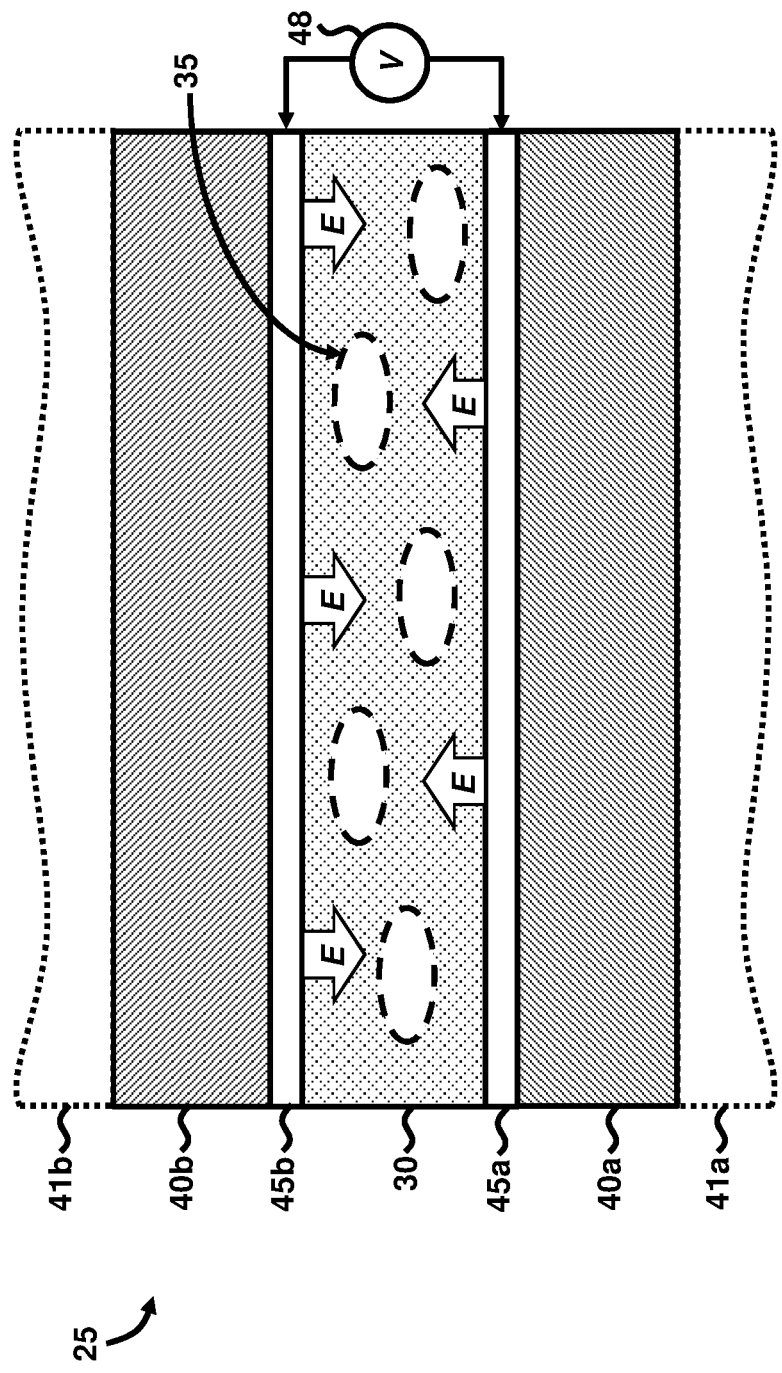
FIG. 3 is a cross-sectional diagram illustrating a creation of an electric field in the polymer layer of the backlight unit of FIG. 1, according to an example.

As shown in FIG. 3, with reference to FIGS. 1 and 2, the first transparent conductive film 45a and the second transparent conductive film 45b may sandwich the polymer material 50 to create an electric field E in the polymer material 50 upon receiving a voltage V. According to an example, the voltage V may be applied by any suitable voltage source 48 and at any voltage level suitable for the first transparent conductive film 45a and the second transparent conductive film 45b. According to an example, the voltage V comprises an AC voltage. Application of the voltage V creates the electric field E, which electrically actuates the polymer layer 30 causing a change in the orientation ϕ of the liquid crystal molecules 35. The voltage V may be turned on or off to cause the orientation ϕ of the liquid crystal molecules 35 to change from a uniform orientation to a random or non-uniform orientation, respectively. In other words, when the voltage V is turned on causing the electric field E to electrically actuate the polymer layer 30, the orientation ϕ of the liquid crystal molecules 35 may be uniform. Conversely, when the voltage V is turned off causing no electric field E and resulting in no electrical actuation of the polymer layer 30, the orientation ϕ of the liquid crystal molecules 35 may be non-uniform or random. In another example, instead of an on/off attribute for controlling the voltage V, there may be an attenuation of the voltage V to below a threshold voltage level that is sufficient to create an adequate electric field E in order to cause the orientation ϕ of the liquid crystal molecules 35 to change from a uniform orientation to a random or non-uniform orientation. In this regard, the voltage V may not be turned off completely to cause the orientation ϕ of the liquid crystal molecules 35 to become random or non-uniform, but rather once the level of the voltage V decreases below the threshold level, then the electric field E is no longer sufficiently strong to cause the orientation ϕ of the liquid crystal molecules 35 to become random or non-uniform.

According to an example, in the light guide plate 25, the first polyester film 40a and the second polyester film 40b may be adjacent to substrates 41a, 41b, respectively. The substrates 41a, 41b may comprise glass, poly(methyl methacrylate) (PMMA), polyimide, or plastic material according to some examples. In another example, the first polyester film 40a and the second polyester film 40b may be part of the respective substrates 41a, 41b.

Figure 4:
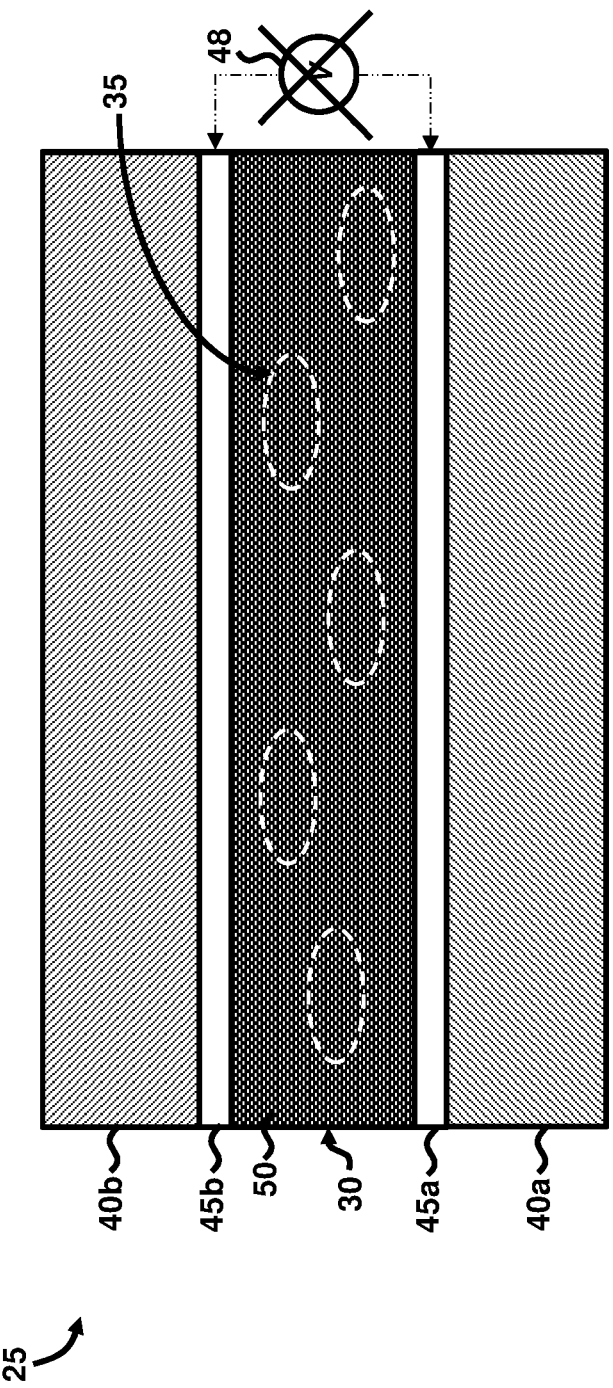
FIG. 4 is a cross-sectional diagram illustrating a change in opacity of the polymer layer of the backlight unit of FIG. 1 due to a voltage change, according to an example.

As shown in FIG. 4, with reference to FIGS. 1 through 3, the polymer material 50 may become opaque when the voltage V is turned off. The opacity of the polymer material 50 may result in the non-uniformity and randomness of the orientation ϕ of the liquid crystal molecules 35, which may cause the light 20 to scatter and thereby causing the polymer material 50 to become opaque with the scattered light 20. Conversely, as described above, when the voltage V is turned on and the orientation ϕ of the liquid crystal molecules 35 is uniform, the light 20 is transmitted through the polymer material 50 without scattering causing the polymer material 50 to appear clear.

Figure 5:
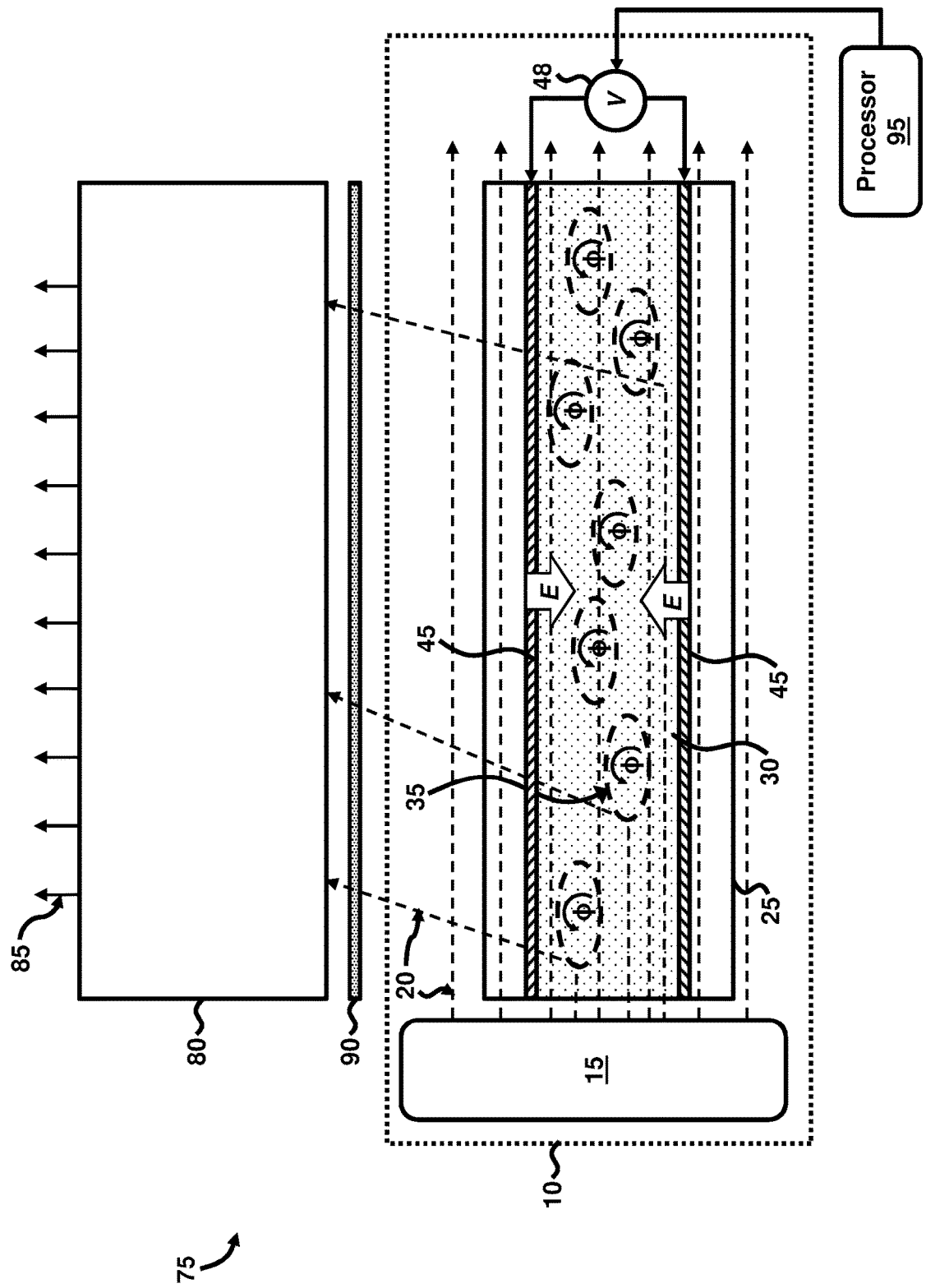
FIG. 5 is a cross-sectional diagram illustrating a display device to display an image, according to an example.

FIG. 5, with reference to FIGS. 1 through 4, illustrates a display device 75 comprising a display panel 80 to display an image 85. The display device 75 may be part of an overall computing or electronic system, or it may be a self-contained display device 75 comprising its own processing and memory capabilities, etc. In an example, the display panel 80 may comprise an LCD panel. The image 85 may be displayed and/or projected on/from the display panel 80 and may be engaged through touch sensing. The image 85 may include any of still images and video images and combinations thereof, and may include a full spectrum of colors generated by a red (R), green (G), and blue (B) combination of pixels, according to an example.

The display device 75 comprises a backlight unit 10 to provide light 20 to the display panel 80. The backlight unit 10 comprises a light emitting unit 15 to emit the light 20, a light guide plate 25 to transmit the light 20 emitted from the light emitting unit 15, a pair of electrodes 45 adjacent to the light guide plate 25, and a polymer layer 30 comprising liquid crystal molecules 35 within the light guide plate 25. The liquid crystal molecules 35 are to change orientation ϕ upon being introduced to an electric field E created by the pair of electrodes 45 to change an opacity of the light guide plate 25. The display device 75 further comprises at least one film 90 to collimate and direct light 20 from the backlight unit 10 to the display panel 80. The display device 75 also includes a processor 95 to switch voltage V being applied on/off to the pair of electrodes 45.

The light emitting unit 15 may comprise a LED, a fluorescent lamp, or other type of component capable of emitting light 20. The light 20 may be emitted in a substantially uniform manner or may be directed non-uniformly according to various examples. Moreover, according to an example, the light emitting unit 15 may selectively emit the light 20 such that only portions of the light emitting unit 15 emit light 20, or the light 20 may be emitted in phases and intensities from the light emitting unit 15 including in a strobe-like effect. The light 20 may be directed linearly away from the light emitting unit 15 and angularly, according to some examples. Furthermore, the intensity of the light 20 may be based on the power of the light emitting unit 15. A light guide plate 25 is positioned adjacent to the light emitting unit 15. The light guide plate 25 may contact the light emitting unit 15 or may be slightly spaced apart from the light emitting unit 15. The light guide plate 25 may comprise translucent material to permit light 20 to enter and exit therethrough. In an example, the light guide plate 25 may transmit the light 20 emitted from the light emitting unit 15. Accordingly, the light guide plate 25 may transmit the light 20 through any of the top, bottom, and sides of the light guide plate 25.

The pair of electrodes 45 may be analogous to the first transparent conductive film 45a and the second transparent conductive film 45b as described above with respect to FIGS. 2 through 4. Accordingly, the pair of electrodes 45 may surround the two opposite sides of the polymer layer 30, thereby sandwiching the polymer layer 30. The polymer layer 30 may comprise translucent material, and is positioned to receive the light 20 and redirect the light 20 in various directions. The liquid crystal molecules 35 may be dissolved or dispersed into a liquid polymer followed by a solidification or curing to create the polymer layer 30. During the change of the polymer from a liquid to a solid polymer layer 30, the liquid crystal molecules 35 become materially incompatible with the solid polymer layer 30 and form droplets throughout the polymer layer 30. These droplets are referred to as the liquid crystal molecules 35 as shown in FIGS. 5 through 9 and described herein. The liquid crystal molecules 35 are provided to change orientation ϕ upon being electrically actuated (e.g., by applying an electric field E) due to the voltage V being applied to the pair of electrodes 45 in order to change the opacity of the light guide plate 25; namely, the opacity of the polymer layer 30. The orientation ϕ of the liquid crystal molecules 35 may be changed from a uniform orientation to a random orientation based on being electrically actuated or not being electrically actuated, respectively. The light scattering ability and/or power of the polymer layer 30 is adjustable through the application of the electric field E, for example. When the power is off; i.e., the polymer layer 30 is not electrically actuated, the visible light 20 scatters through the polymer layer 30 and the polymer layer 30 becomes opaque, according to an example. When the power is on; i.e., the polymer layer 30 is electrically actuated, the visible light 20 transmits through the polymer layer 30 and the polymer layer 30 becomes clear, according to an example. Furthermore, the amount of voltage V and the corresponding intensity of the electric field E may be attenuated so that the voltage V and/or electric field E is not completely off, but rather is below a threshold required to cause the orientation ϕ of the liquid crystal molecules 35 to be changed from a uniform orientation to a random orientation.

The at least one film 90 to collimate and direct light 20 from the backlight unit 10 to the display panel 80 may comprise any of a diffusion film, a polarizing film, a prism film, and a shielding film, or any other type of film to filter the light 20. The processor 95 may control the level of voltage V being applied to the pair of electrodes 45 or the processor 95 may switch the voltage V on/off to the pair of electrodes 45. As described above, the voltage V may be set to an on/off function to control the electric field E produced by the pair of electrodes 45, or the voltage V may be attenuated to be always on, but controllable by the processor 95 to become reduced below a threshold level sufficient to prevent the pair of electrodes 45 from producing an electric field E capable of causing a change in the orientation $\phi$ of the liquid crystal molecules 35.

In some examples, the processor 95 described herein and/or illustrated in the figures may be embodied as hardware-enabled modules and may be configured as a plurality of overlapping or independent electronic circuits, devices, and discrete elements packaged onto a circuit board to provide data and signal processing functionality within a computer. An example might be a comparator, inverter, or flip-flop, which could include a plurality of transistors and other supporting devices and circuit elements. The modules that are configured with electronic circuits process computer logic instructions capable of providing digital and/or analog signals for performing various functions as described herein. The various functions can further be embodied and physically saved as any of data structures, data paths, data objects, data object models, object files, database components. For example, the data objects could be configured as a digital packet of structured data. The data structures could be configured as any of an array, tuple, map, union, variant, set, graph, tree, node, and an object, which may be stored and retrieved by computer memory and may be managed by processors, compilers, and other computer hardware components. The data paths can be configured as part of a computer CPU that performs operations and calculations as instructed by the computer logic instructions. The data paths could include digital electronic circuits, multipliers, registers, and buses capable of performing data processing operations and arithmetic operations (e.g., Add, Subtract, etc.), bitwise logical operations (AND, OR, XOR, etc.), bit shift operations (e.g., arithmetic, logical, rotate, etc.), complex operations (e.g., using single clock calculations, sequential calculations, iterative calculations, etc.). The data objects may be configured as physical locations in computer memory and can be a variable, a data structure, or a function. In the embodiments configured as relational databases, the data objects can be configured as a table or column. Other configurations include specialized objects, distributed objects, object-oriented programming objects, and semantic web objects, for example. The data object models can be configured as an application programming interface for creating HyperText Markup Language (HTML) and Extensible Markup Language (XML) electronic documents. The models can be further configured as any of a tree, graph, container, list, map, queue, set, stack, and variations thereof. The data object files are created by compilers and assemblers and contain generated binary code and data for a source file. The database components can include any of tables, indexes, views, stored procedures, and triggers.

In some examples, the processor 95 may comprise a central processing unit (CPU) of the display device 75 or an associated computing device, not shown. In other examples the processor 95 may be a discrete component independent of other processing components in the display device 75. In other examples, the processor 95 may be a microprocessor, microcontroller, hardware engine, hardware pipeline, and/or other hardware-enabled device suitable for receiving, processing, operating, and performing various functions required by the display device 75. The processor 95 may be provided in the display device 75, coupled to the display device 75, or communicatively linked to the display device 75 from a remote networked location, according to various examples.

Figure 6:
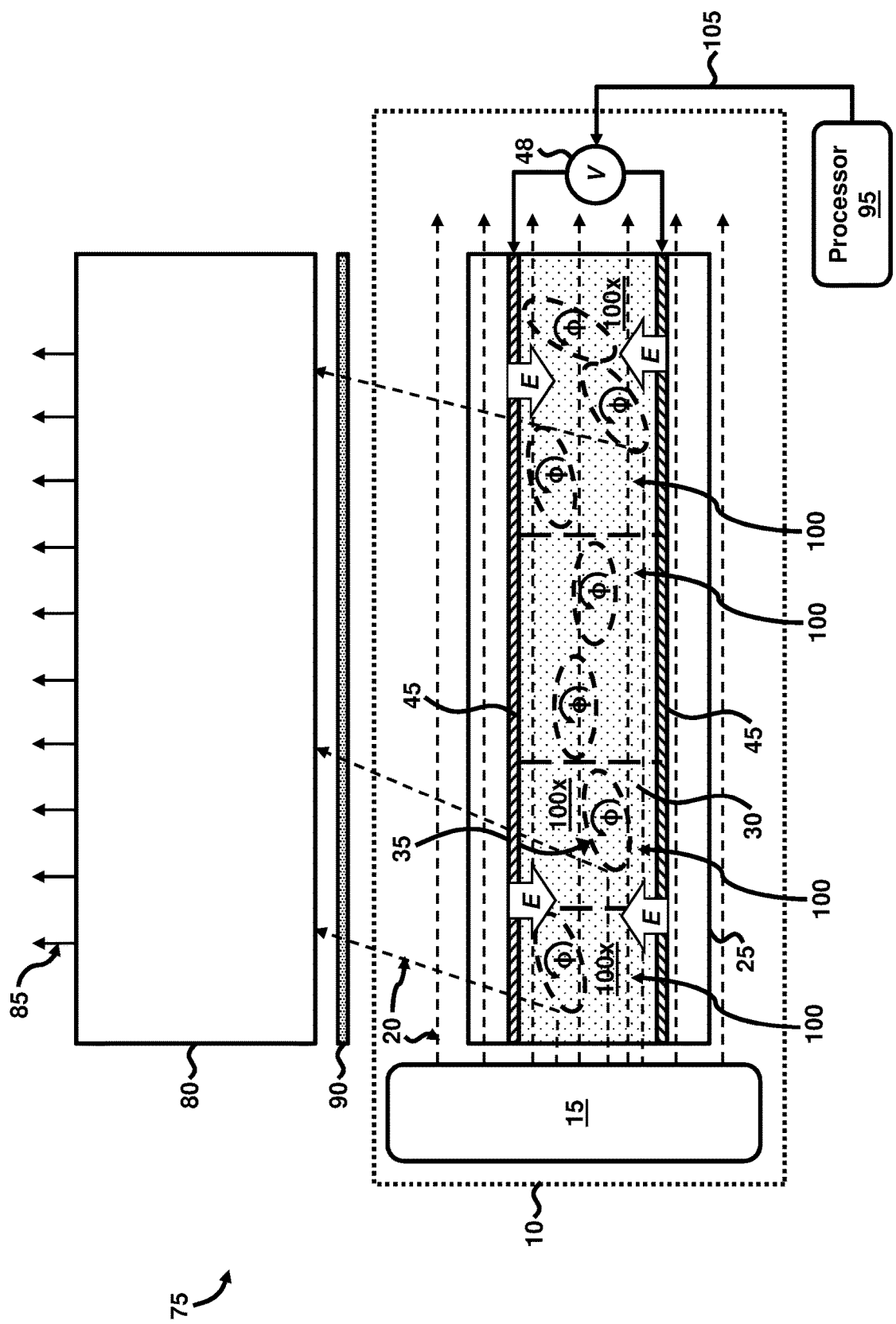
FIG. 6 is a cross-sectional diagram illustrating different zones containing liquid crystal molecules in the polymer layer of the display device of FIG. 5, according to an example.

As shown in FIG. 6, with reference to FIGS. 1 through 5, the polymer layer 30 may comprise a plurality of zones 100 containing the liquid crystal molecules 35. The plurality zones 100 may be based on selectively identified areas of the polymer layer 30 or may be based on any other type of pattern selected to identify the locations of the plurality of zones 100. Moreover, the plurality of zones 100 may or may not be sectioned by physical markers in the polymer layer 30 to designate the locations of the plurality of zones 100. Furthermore, the number of liquid crystal molecules 35 within any of the plurality of zones 100 may be uniform or random. According to some examples, the plurality of zones 100 may extend across the entire length and/or width of the polymer layer 30, or the plurality of zones 100 may be constrained to only a selected portion of the overall length and/or width of the polymer layer 30. The pair of electrodes 45 are to selectively create the electric field E to selective zones 100x based on instructions 105 received from the processor 95. Here, the instructions 105 may indicate how to control the voltage V being applied to the pair of electrodes 45. In this regard, in an example, the processor 95 may transmit voltage control instructions 105 to a voltage source 48, which may turn on/off or otherwise attenuate the voltage V being applied to the pair of electrodes 45, which correspondingly controls the presence or absence of the electric field E applied to the polymer layer 30 and the corresponding liquid crystal molecules 35. Furthermore, the instructions 105 transmitted by the processor 95 may selectively control the voltage source 48 to apply voltage V to selective portions of the pair of electrodes 45, which may be assembled as a plurality of conductive films, in order to further control and isolate which selective zones 100x of the polymer layer 30 is introduced to the electric field E. This permits selectively changing the orientation $\phi$ of the liquid crystal molecules 35 based on their positioning in the selective zones 100x, which then permits the control of the direction, amount, and intensity of the light 20 transmitted through the light guide plate 25 including the opacity of the light guide plate 25, which controls the uniformity of the brightness of the light 20 transmitted from the light guide plate 25 to the display panel 80, and which further controls; i.e., enhancing, the dimming properties of the resulting image 85 displayed and/or projected by the display panel 80.

Figure 7:
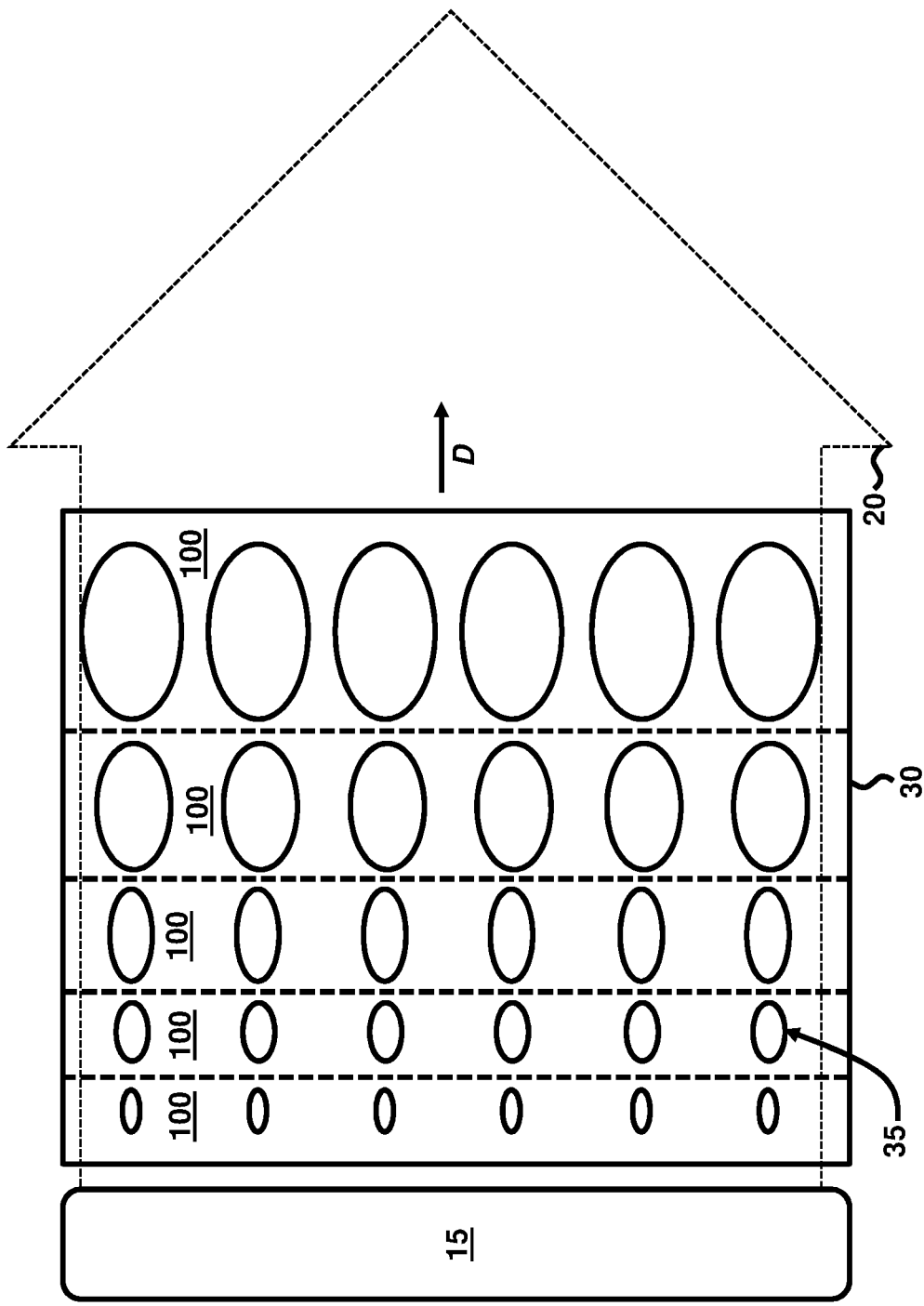
FIG. 7 is a cross-sectional diagram illustrating different sizes of zones in the polymer layer of the display device of FIG. 5, according to an example.

As shown in FIG. 7, with reference to FIGS. 1 through 6, the plurality of zones 100 may become progressively larger in size in the polymer layer 30 in a direction D moving away from the light emitting unit 15. In this example, the number of liquid crystal molecules 35 may similarly increase moving in the direction D. In FIG. 7, the indication of the liquid crystal molecules 35 does not suggest that the actual liquid crystal molecules 35 increase in size, but rather, the number of liquid crystal molecules 35 may become large moving in the direction D. The light 20 may reach all of the plurality of zones 100 as indicated in FIG. 7, or the light 20 may reach only some of the plurality of zones 100, according to some examples.

Figure 8:
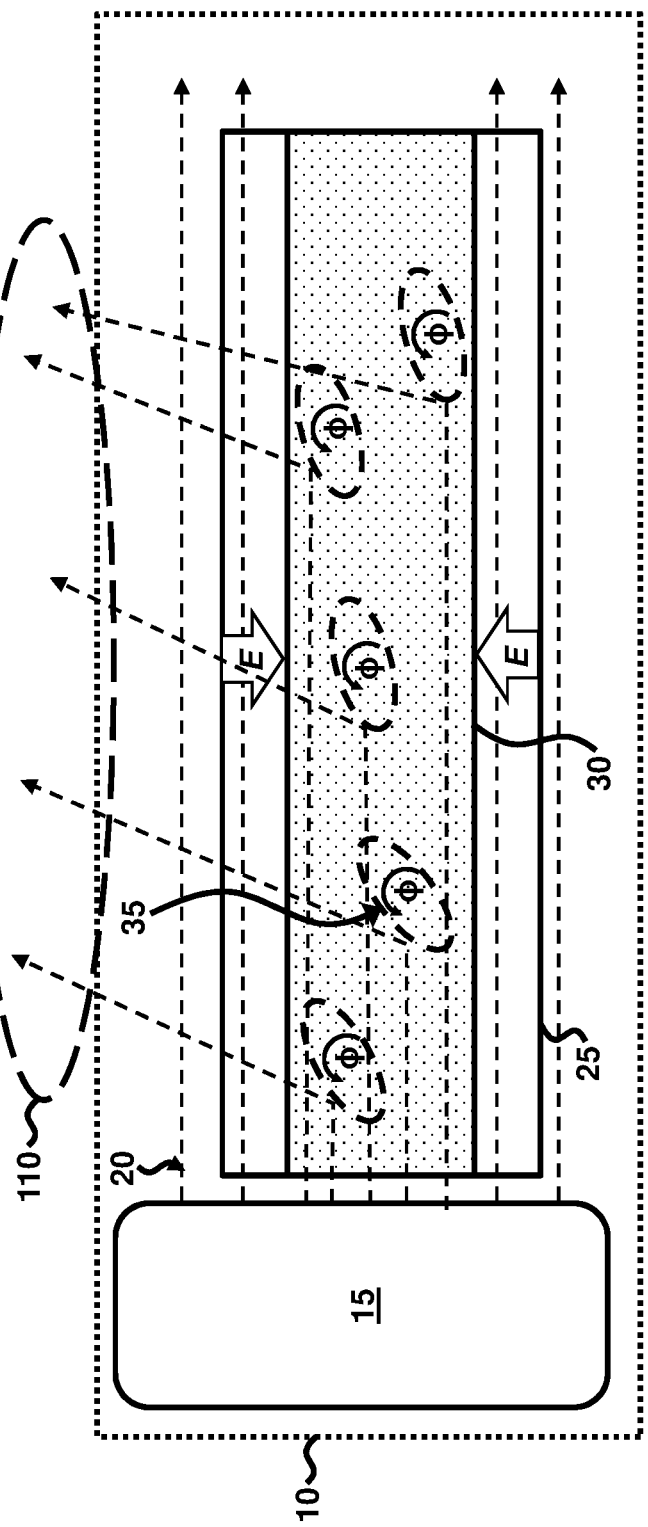
FIG. 8 is a cross-sectional diagram illustrating changes in the light path based on an orientation of the liquid crystal molecules in the polymer layer of the display device of FIG. 5, according to an example.

As shown in FIG. 8, with reference to FIGS. 1 through 7, a light path 110 of the light 20 may be changed based on the change in orientation ϕ of the liquid crystal molecules 35. When the change in orientation ϕ of the liquid crystal molecules 35 occurs, the light 20 may become refracted once it encounters the non-uniform liquid crystal molecules 35, and the refraction may result in the light path 110 of the light 20 being directed out of the light guide plate 25 towards the display panel 80, which is not shown in FIG. 8. According to some examples, the non-uniformity of the liquid crystal molecules 35 may be random such that the change in orientation ϕ for corresponding liquid crystal molecules 35 may be different based, in part, on their respective locations in the selective zones 100x as described with reference to FIG. 6, or the strength of the electric field E that is being applied and the area(s) of the polymer layer 30 exposed to the electric field E.

Figure 9:
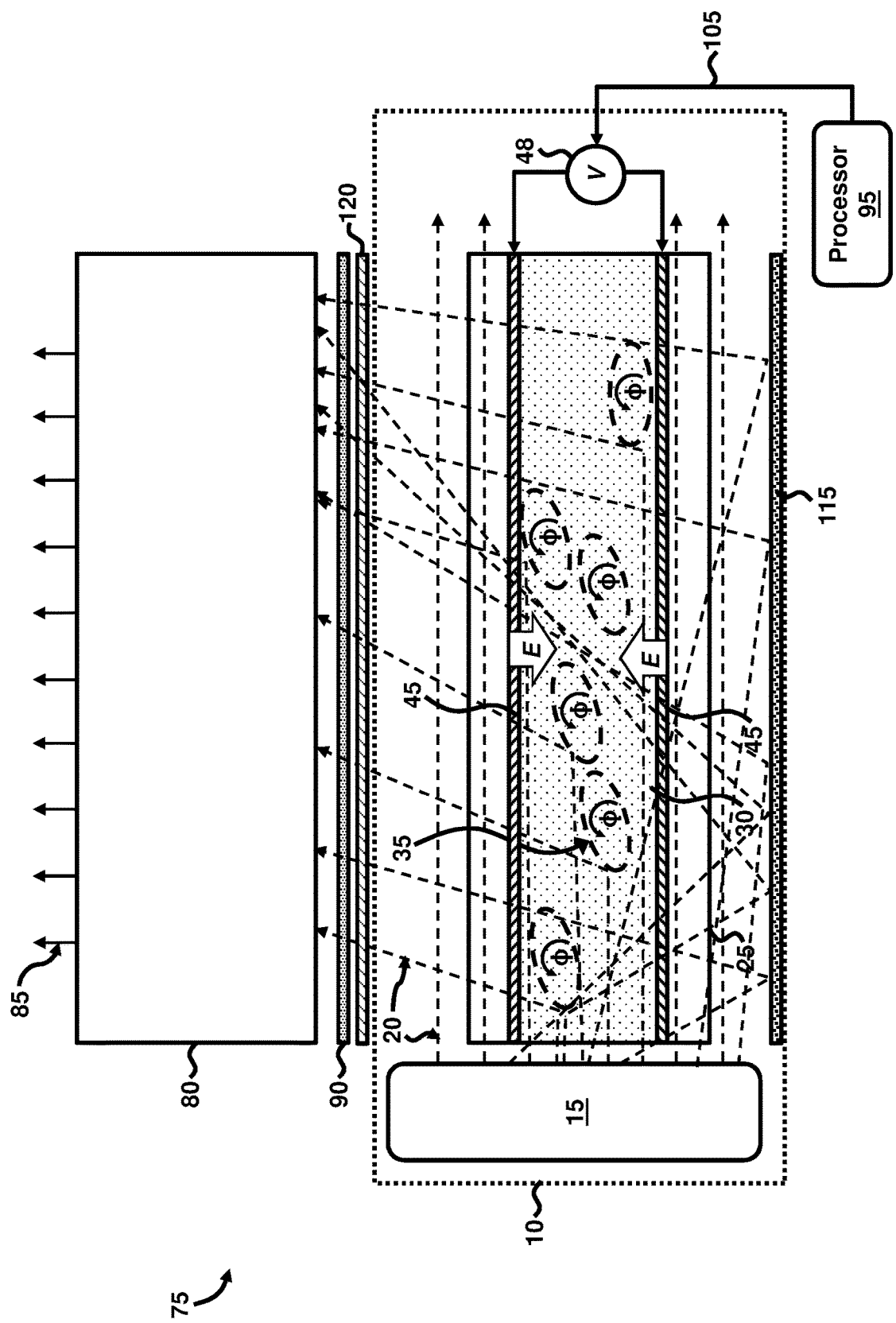
FIG. 9 is a cross-sectional diagram illustrating additional aspects of the display device of FIG. 5, according to an example.

As shown in FIG. 9, with reference to FIGS. 1 through 8, the display device 75 may comprise a reflector 115 adjacent to the light guide plate 25 to reflect light 20 through the light guide plate 25. The reflector 115 may be used to assist in directing the light 20 through the light guide plate 25 towards the display panel 80. Moreover, upon the introduction of the electric field E, and the corresponding change in orientation ϕ of the liquid crystal molecules 35, the light 20 may be refracted towards the reflector 115, in an example. Also, the light 20 being emitted from the light emitting unit 15 may be directed towards the reflector 115 prior to encountering the liquid crystal molecules 35, and upon encountering the non-uniform or randomly oriented liquid crystal molecules 35, the light 20 may be directed towards the reflector 115 for transmission towards the display panel 80. Accordingly, the non-uniform, random, or irregularly oriented liquid crystal molecules 35 may redirect the light 20 directly towards the display panel 80 or it may redirect the light 20 towards the reflector 115, which may then redirect the light 20 back towards the display panel 80. Furthermore, the light 20 that is reflected by the reflector 115 may encounter the liquid crystal molecules 35 again causing further refraction of the light 20. The resulting light 20 that is transmitted to the display panel 80 may be directed in a uniform or non-uniform manner based on a desired control of the brightness and desired uniformity of the image 85, which may be further controlled by the processor 95 based on the instructions 105 provided to the voltage source 48 for controlling the timing and frequency of the on/off or attenuation of the voltage V applied to the pair of electrodes 45.

Furthermore, the display device 75 may comprise a diffusion layer 120 between the light guide plate 25 and the display panel 80 to filter the transmitted light 20 before the light 20 is transmitted to the display panel 80. The diffusion layer 120 may be part of the at least one film 90 or the diffusion layer 120 may be a separate component apart from the at least one film 90, according to some examples. Additionally, in some examples, the diffusion layer 120 may be positioned in between the at least one film 90 and the display panel 80, or the diffusion layer 120 may be positioned in between the at least one film 90 and the backlight unit 10, or the diffusion layer 120 may be embedded in the at least one film 90.

According to an example, the light guide plate 25 may be devoid of patterned structures; i.e., micro-structures, to transmit or otherwise refract or direct the light 20 through or from the light guide plate 25, and instead may rely on the presence of the liquid crystal molecules 35 and their corresponding change in orientation ϕ due to the application of the voltage V to the pair of electrodes 45 and the corresponding introduction of the electric field E to the polymer layer 30, in order to redirect the light 20 out of the light guide plate 25 and towards the display panel 80.

Figure 10:
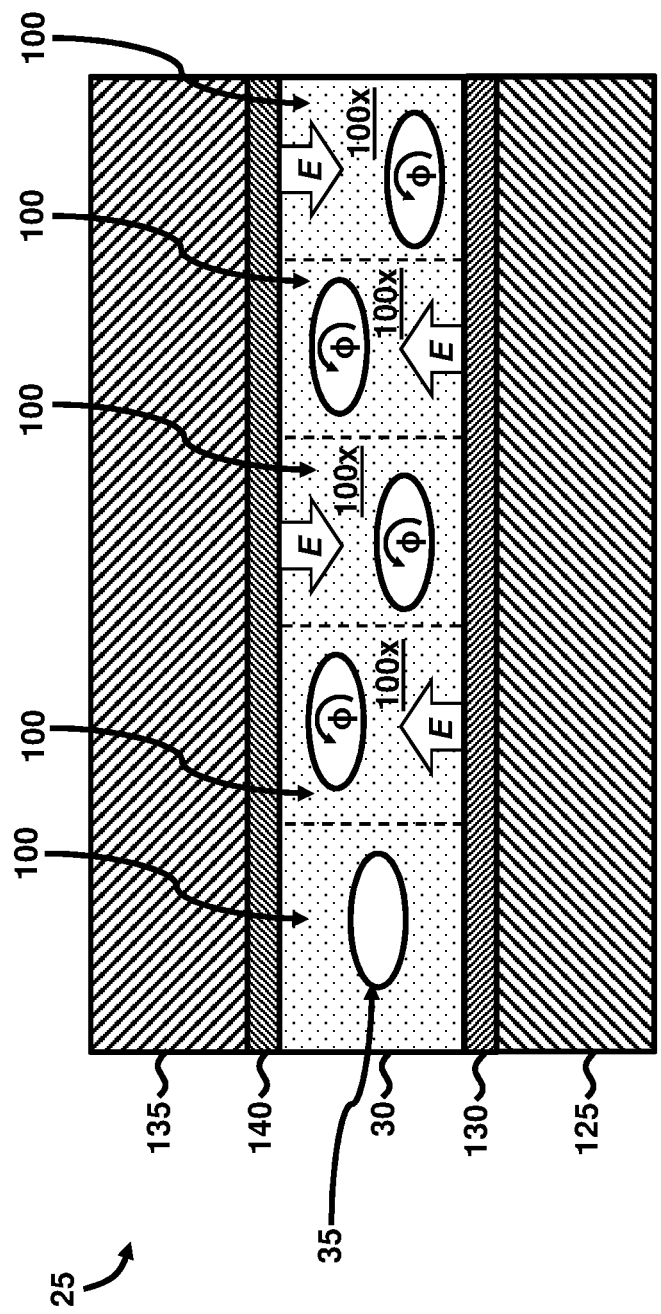
FIG. 10 is a cross-sectional diagram illustrating a light guide plate, according to an example.

FIG. 10, with reference to FIGS. 1 through 9, illustrates a light guide plate 25 comprising a first substrate 125, a first electrode 130 adjacent to the first substrate 125, a second substrate 135, a second electrode 140 adjacent to the second substrate 145, and a polymer layer 30 of liquid crystal molecules 35 arranged in zones 100 in between the first electrode 130 and the second electrode 140. According to some examples, the first substrate 125 and the second substrate 135 may comprise glass, PMMA, polyimide, or plastic material. In an example, the first electrode 130 and the second electrode 140 may comprise ITO material. In another example, the first electrode 130 and the second electrode 140 may comprise AgNWs material. The first electrode 130 and the second electrode 140 may be arranged to surround the opposite sides of the polymer layer 30 such that the first electrode 130 and the second electrode 140 sandwich the polymer layer 30.

The polymer layer 30 may comprise translucent material, and is positioned to receive light 20 and redirect the light 20 in various directions. The liquid crystal molecules 35 may be dissolved or dispersed into a liquid polymer followed by a solidification or curing to create the polymer layer 30. During the change of the polymer from a liquid to a solid polymer layer 30, the liquid crystal molecules 35 become materially incompatible with the solid polymer layer 30 and form droplets throughout the polymer layer 30. These droplets are referred to as the liquid crystal molecules 35 as shown in FIGS. 10 through 12 and described herein. The liquid crystal molecules 35 are provided to change orientation ϕ upon being electrically actuated (e.g., by applying an electric field E) to change a luminance L of the transmitted light 20 and/or the opacity of the polymer layer 30 and the light guide plate 25 in general. The orientation ϕ of the liquid crystal molecules 35 may be changed from a uniform orientation to a random orientation based on being electrically actuated or not being electrically actuated, respectively. The light scattering ability and/or power of the polymer layer 30 is adjustable through the application of the electric field E, for example. When the power is off; i.e., the polymer layer 30 is not electrically actuated, the visible light 20 scatters through the polymer layer 30 and the polymer layer 30 becomes opaque, according to an example. When the power is on; i.e., the polymer layer 30 is electrically actuated, the visible light 20 transmits through the polymer layer 30 and the polymer layer 30 becomes clear, according to an example. Furthermore, the intensity of the electric field E may be attenuated so that the voltage V and/or electric field E is not completely off, but rather is below a threshold required to cause the orientation ϕ of the liquid crystal molecules 35 to be changed from a uniform orientation to a random orientation.

The plurality zones 100 may be based on selectively identified areas of the polymer layer 30 or may be based on any other type of pattern selected to identify the locations of the plurality of zones 100. Moreover, the plurality of zones 100 may or may not be sectioned by physical markers in the polymer layer 30 to designate the locations of the plurality of zones 100. Furthermore, the number of liquid crystal molecules 35 within any of the plurality of zones 100 may be uniform or random. According to some examples, the plurality of zones 100 may extend across the entire length and/or width of the polymer layer 30, or the plurality of zones 100 may be constrained to only a selected portion of the overall length and/or width of the polymer layer 30. The liquid crystal molecules 35 are to change orientation φ upon the first electrode 130 and the second electrode 140 providing an electric field E to selective zones 100x. The zones 100, 100x may comprise different sizes such that the number of liquid crystal molecules 35 in the various zones 100, 100x may be different from one another.

As shown in FIG. 11, with reference to FIGS. 1 through 10, the liquid crystal molecules 35 may comprise a uniform orientation $\phi_1$ to a direction d of light 20 transmitted through the polymer layer 30 to permit a total reflection of the light 20 through the polymer layer 30. In this example, the uniform orientation $\phi_1$ may occur in the presence of the electric field E upon the polymer layer 30. As indicated the light 20 does not refract upon encountering the liquid crystal molecules 35 due to their uniform orientation $\phi_1$ being aligned to the direction d.

As shown in FIG. 12, with reference to FIGS. 1 through 11, the liquid crystal molecules 35 may comprise a random orientation $\phi_2$ to a direction d of light 20 transmitted through the polymer layer 30 to prevent a total reflection of the light 20 through the polymer layer 30. In this example, the random orientation $\phi_2$ may occur in the absence of the electric field E upon the polymer layer 30. As indicated the light 20 refracts upon encountering the liquid crystal molecules 35 due to their non-uniform, random, and/or irregular orientation $\phi_2$ being misaligned to the direction d.

The various examples described above provide for an adjustable light redirection patterning technique in a light guide plate 25 without requiring a separate micro-structure to be attached to the light guide plate 25 for redirecting light 20. This technique utilizes liquid crystal molecules 35 within the light guide plate 25 to redirect the light 20, which reduces the manufacturing tooling costs and time compared with micro-structure based devices. Moreover, the selective control of the orientation φ of the liquid crystal molecules 25 that are arranged in different zones 100 in the light guide plate 25 allows for further control of the dimming performance of the corresponding image 85 that is produced by the display panel 80, and further controls the uniformity of the light 20 entering the display panel 80.

The present disclosure has been shown and described with reference to the foregoing implementations. Although specific examples have been illustrated and described herein it is manifestly intended that other forms, details, and examples may be made without departing from the scope of the disclosure that is defined in the following claims.

What is claimed is:

1. A backlight unit comprising:
   a light emitting unit to emit light;
   a light guide plate to transmit the light emitted from the light emitting unit; and
   a polymer layer comprising:
   a first transparent conductive film;
   a second transparent conductive film; and
   a polymer material containing liquid crystal molecules and placed between the first transparent conductive film and the second transparent conductive film to create an electric field in the polymer material upon receiving a voltage wherein the liquid crystal molecules are to change orientation upon being electrically actuated to change a luminance of the transmitted light.

2. The backlight unit of claim 1, wherein the polymer layer further comprises a first polyester film adjacent to the first transparent conductive film.

3. The backlight unit of claim 2, wherein the polymer layer further comprises a second polyester film adjacent to the second transparent conductive film.

4. The backlight unit of claim 1 wherein the polymer layer comprises a plurality of zones containing the liquid crystal molecules, and wherein a pair of electrodes are to selectively create the electric field to selective zones.

5. The backlight unit of claim 1, wherein the polymer material becomes opaque when the voltage is turned off.

6. A display device comprising:
   a display panel to display an image;
   a backlight unit to provide light to the display panel, wherein the backlight unit comprises:
   a light emitting unit to emit the light;
   a light guide plate to transmit the light emitted from the light emitting unit;
   a pair of electrodes adjacent to the light guide plate; and
   a polymer layer comprising liquid crystal molecules within the light guide plate, wherein the liquid crystal molecules are to change orientation upon being introduced to an electric field created by the pair of electrodes to change an opacity of the light guide plate;
   at least one film to collimate and direct light from the backlight unit to the display panel; and
   a processor to switch voltage being applied on/off to the pair of electrodes.

7. The display device of claim 6, wherein the polymer layer comprises a plurality of zones containing the liquid crystal molecules, and wherein the pair of electrodes are to selectively create the electric field to selective zones based on instructions received from the processor.

8. The display device of claim 7, wherein the plurality of zones become progressively larger in size in the polymer layer in a direction moving away from the light emitting unit.

9. The display device of claim 6, wherein a light path of the light is changed based on the change in orientation of the liquid crystal molecules.

10. The display device of claim 6, comprising:
    a reflector adjacent to the light guide plate to reflect light through the light guide plate; and
    a diffusion layer between the light guide plate and the display panel to filter the transmitted light.

11. The display device of claim 6, wherein the light guide plate is devoid of patterned structures to transmit the light.

12. A light guide plate comprising:
    a first substrate;
    a first electrode adjacent to the first substrate;
    a second substrate;
    a second electrode adjacent to the second substrate; and
    a polymer layer of liquid crystal molecules arranged in zones of different sizes in between the first electrode and the second electrode, wherein the liquid crystal molecules are to change orientation upon the first electrode and the second electrode providing an electric field to selective zones.

13. The light guide plate of claim 12, wherein the zones become progressively larger in size in the polymer layer in a direction moving away from light transmitted through the polymer layer.

14. The light guide plate of claim 12, wherein the liquid crystal molecules comprise a uniform orientation to a direction of light transmitted through the polymer layer to permit a total reflection of the light through the polymer layer, and wherein the uniform orientation occurs in the presence of the electric field.

15. The light guide plate of claim 12, wherein the liquid crystal molecules comprise a random orientation to a direction of light transmitted through the polymer layer to prevent a total reflection of the light through the polymer layer, and wherein the random orientation occurs in the absence of the electric field.

* * * * *